(12) United States Patent
Tibbott (10) Patent No.: US 9,062,561 B2
(45) Date of Patent: Jun. 23, 2015

(54) ENDWALL COMPONENT FOR A TURBINE STAGE OF A GAS TURBINE ENGINE

(75) Inventor: Ian Tibbott, Lichfield (GB)

(73) Assignee: ROLLS-ROYCE PLC, London (GB)

( * ) Notice: Subject to any disclaimer, the term of this patent is extended or adjusted under 35 U.S.C. 154(b) by 550 days.

(21) Appl. No.: 13/207,784

(22) Filed: Aug. 11, 2011

(65) Prior Publication Data

US 2012/0076645 A1 Mar. 29, 2012

(30) Foreign Application Priority Data

Sep. 29, 2010 (GB) .................................. 1016335.0

(51) Int. Cl.
*F01D 11/24* (2006.01)
*F01D 11/00* (2006.01)
*B60G 21/055* (2006.01)

(52) U.S. Cl.
CPC .............. *F01D 11/24* (2013.01); *F01D 11/001* (2013.01); *F05D 2240/15* (2013.01); *F05D 2240/11* (2013.01); *B60G 21/055* (2013.01)

(58) Field of Classification Search
CPC ....... F01D 11/00; F01D 11/001; F01D 11/08; F01D 11/14; F01D 11/20; F01D 11/24; F05D 2240/11; F05D 2240/15
USPC ........... 415/115, 116, 170.1, 173.1, 177, 178, 415/180
See application file for complete search history.

(56) References Cited

U.S. PATENT DOCUMENTS

| | | | | |
|---|---|---|---|---|
| 3,365,172 A | * | 1/1968 | Howald et al. ................. | 415/117 |
| 3,411,794 A | * | 11/1968 | Allen ............................. | 277/414 |
| 3,529,905 A | * | 9/1970 | Meginnis ...................... | 415/176 |
| 3,584,972 A | * | 6/1971 | Bratkovich et al. ........ | 416/229 R |
| 3,606,572 A | * | 9/1971 | Schewdland ................. | 416/90 R |
| 3,606,573 A | * | 9/1971 | Emmerson .................. | 416/90 R |
| 3,698,834 A | * | 10/1972 | Meginnis ..................... | 416/96 R |
| 3,719,365 A | * | 3/1973 | Emmerson et al. ........... | 277/414 |

(Continued)

FOREIGN PATENT DOCUMENTS

| | | |
|---|---|---|
| EP | 1 316 772 A1 | 6/2003 |
| EP | 1 555 393 A2 | 7/2005 |

(Continued)

OTHER PUBLICATIONS

Fukuyama, English Translation of JP 60135607 A, Translated by Phoenix Translations Dec. 2013.*

(Continued)

*Primary Examiner* — Nathaniel Wiehe
*Assistant Examiner* — Wayne A Lambert
(74) *Attorney, Agent, or Firm* — Oliff PLC (57) ABSTRACT

A component of a turbine stage of a gas turbine engine is provided. The component forms an endwall for the working gas annulus of the stage. The component has one or more internal passages behind the endwall which, in use, carry a flow of cooling air providing convective cooling for the component at the endwall. Each passage is formed by a plurality of straight passage sections. The passage sections connect end-to-end such that the connections between nearest-neighbour passage sections form angled bends. A first portion of the passage sections lie in a first plane. A second portion of the passage sections lie in a second plane which is spaced from and parallel to the first plane. A third portion of the passage sections extend between the first and the second planes.

18 Claims, 8 Drawing Sheets

(56) References Cited

U.S. PATENT DOCUMENTS

| | | | |
|---|---|---|---|
| 3,933,442 A * | 1/1976 | Carroll et al. | 428/593 |
| 4,004,056 A * | 1/1977 | Carroll | 428/593 |
| 4,245,769 A * | 1/1981 | Meginnis | 228/173.3 |
| 4,312,186 A * | 1/1982 | Reider | 60/754 |
| 5,375,973 A * | 12/1994 | Sloop et al. | 415/173.1 |
| 5,545,003 A * | 8/1996 | O'Connor et al. | 415/115 |
| 5,810,552 A * | 9/1998 | Frasier | 415/115 |
| 6,247,896 B1 * | 6/2001 | Auxier et al. | 416/97 R |
| 6,255,000 B1 * | 7/2001 | O'Connor et al. | 428/586 |
| 6,705,831 B2 * | 3/2004 | Draper | 415/115 |
| 7,527,474 B1 * | 5/2009 | Liang | 416/1 |
| 7,621,719 B2 * | 11/2009 | Lutjen et al. | 415/173.1 |
| 2001/0048876 A1 * | 12/2001 | Humhauser | 415/139 |
| 2003/0235494 A1 * | 12/2003 | Draper | 415/115 |
| 2006/0210390 A1 * | 9/2006 | Draper et al. | 415/115 |
| 2007/0140835 A1 * | 6/2007 | Albrecht et al. | 415/115 |
| 2007/0227706 A1 * | 10/2007 | Lutjen et al. | 165/109.1 |
| 2008/0240927 A1 | 10/2008 | Bergander et al. | |

FOREIGN PATENT DOCUMENTS

| | | | |
|---|---|---|---|
| EP | 1 726 785 A2 | 11/2006 | |
| EP | 1 865 149 A2 | 12/2007 | |
| EP | 2 159 382 A1 | 3/2010 | |
| GB | 1 376 966 | 12/1974 | |
| GB | 1 487 741 | 10/1977 | |
| JP | 60135607 A * | 7/1985 | F01D 9/02 |
| JP | 63306204 A * | 12/1988 | F01D 5/18 |

OTHER PUBLICATIONS

Shizutani et al., English Translation of JP 63306204 A, Translated by Phoenix Translations Dec. 2013.*

British Search Report issued in British Application No. 1016335.0 dated Jan. 19, 2011.

* cited by examiner

ENDWALL COMPONENT FOR A TURBINE STAGE OF A GAS TURBINE ENGINE

FIELD OF THE INVENTION

The present invention relates to a component of a turbine stage of a gas turbine engine, the component forming an endwall for the working gas annulus of the stage.

BACKGROUND OF THE INVENTION

Figure 1:
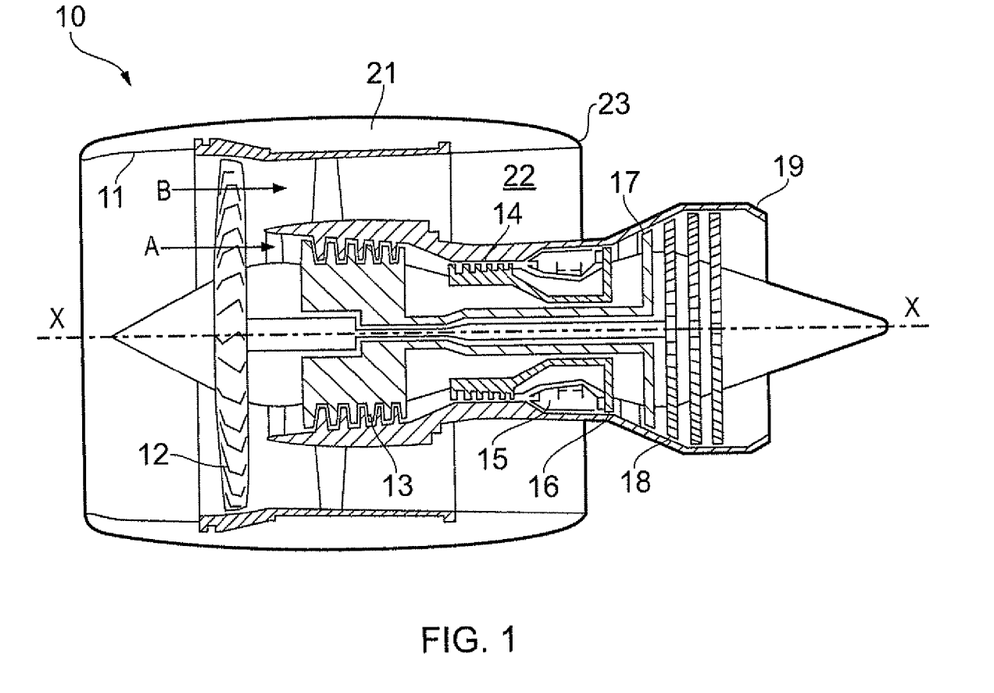
FIG. 1 shows a schematic longitudinal cross-section through a ducted fan gas turbine engine.

With reference to FIG. 1, a ducted fan gas turbine engine generally indicated at 10 has a principal and rotational axis X-X. The engine comprises, in axial flow series, to an air intake 11, a propulsive fan 12, an intermediate pressure compressor 13, a high-pressure compressor 14, combustion equipment 15, a high-pressure turbine 16, and intermediate-pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The performance of gas turbine engines, whether measured in terms of efficiency or specific output, is improved by increasing the turbine gas temperature. It is therefore desirable to operate the turbines at the highest possible temperatures. For any engine cycle compression ratio or bypass ratio, increasing the turbine entry gas temperature produces more specific thrust (e.g. engine thrust per unit of air mass flow). However as turbine entry temperatures increase, the life of an un-cooled turbine falls, necessitating the development of better materials and the introduction of internal air cooling.

In modern engines, the high-pressure turbine gas temperatures are hotter than the melting point of the material of the blades and vanes, necessitating internal air cooling of these airfoil components. During its passage through the engine, the mean temperature of the gas stream decreases as power is extracted. Therefore, the need to cool the static and rotary parts of the engine structure decreases as the gas moves from the high-pressure stage(s), through the intermediate-pressure and low-pressure stages, and towards the exit nozzle.

Figure 2:
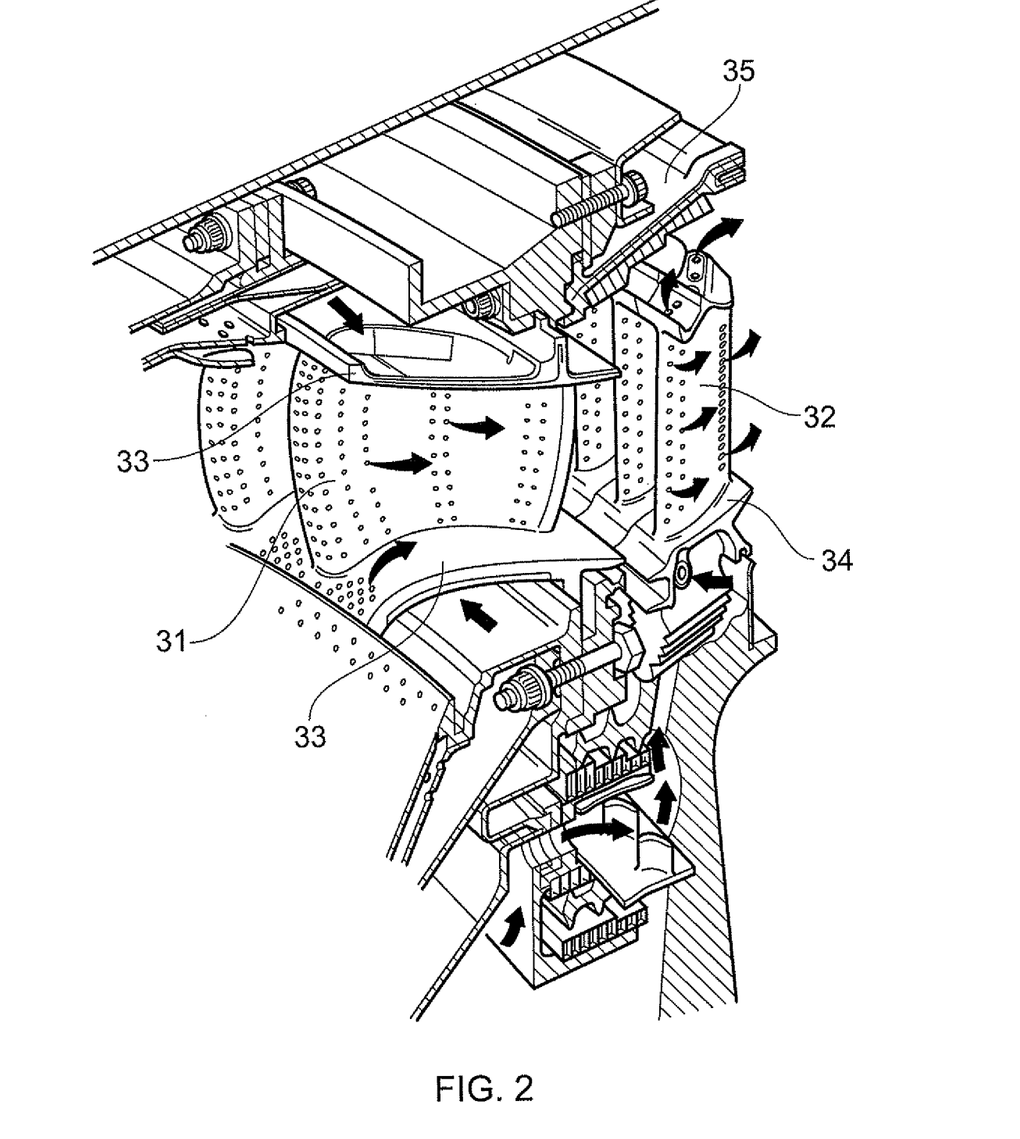
FIG. 2 shows an isometric view of a typical single stage cooled turbine.

FIG. 2 shows an isometric view of a typical single stage cooled turbine. Cooling air flows are indicated by arrows.

Internal convection and external films are the prime methods of cooling the gas path components—airfoils, platforms, shrouds and shroud segments etc. High-pressure turbine nozzle guide vanes 31 (NGVs) consume the greatest amount of cooling air on high temperature engines. High-pressure blades 32 typically use about half of the NGV flow. The intermediate-pressure and low-pressure stages downstream of the HP turbine use progressively less cooling air.

The high-pressure turbine airfoils are cooled by using high pressure air from the compressor that has by-passed the combustor and is therefore relatively cool compared to the gas temperature. Typical cooling air temperatures are between 800 and 1000 K, while gas temperatures can be in excess of 2100 K.

The cooling air from the compressor that is used to cool the hot turbine components is not used fully to extract work from the turbine. Therefore, as extracting coolant flow has an adverse effect on the engine operating efficiency, it is important to use the cooling air effectively.

Ever increasing gas temperature levels combined with a drive towards flatter combustion radial profiles, in the interests of reduced combustor emissions, have resulted in an increase in local gas temperature experienced by the working gas annulus endwalls, which include NGV platforms 33, blade platforms 34 and shroud segments 35 (also known as shroud liners). However, the flow of air that is used to cool these endwalls can be highly detrimental to the turbine efficiency. This is due to the high mixing losses attributed to these cooling flows when they are returned to the mainstream working gas path flow.

Figure 3A:
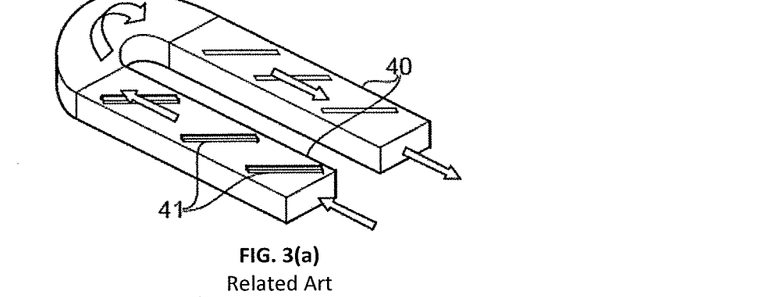
FIGS. 3(a)-(c) show schematically conventional internal cooling passage arrangements.
Figure 3B:
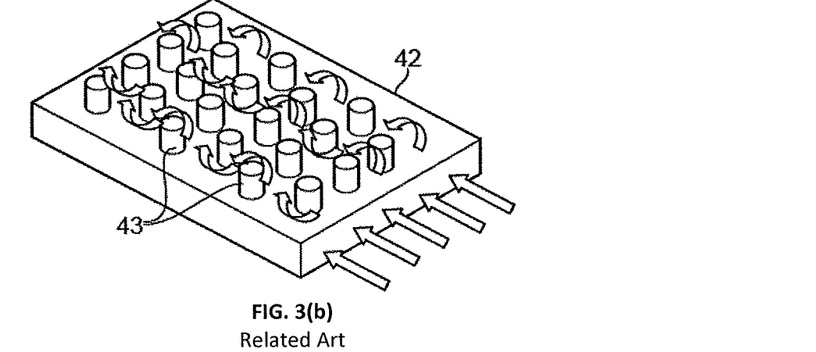
Figure 3C:
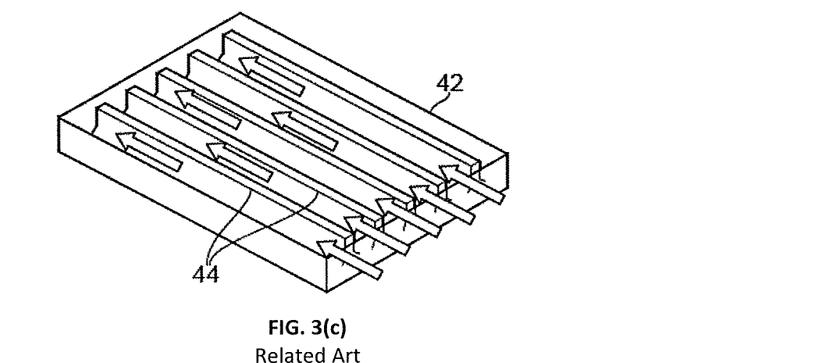

One option is to cool the platforms and shroud segments by an impingement flow of cooling air on the back plane of the gas washed wall of the component. For example, a perforated plate spaced from the gas washed wall and supported by pedestals can form impinging jets, and the spent coolant can then flow back into the working gas path at the rear edges of the component. Unfortunately, limited numbers of impingement jets can produce non uniform heat transfer distributions, and the cross flow from spent coolant can reduce the effectiveness of the impingement jets at the more downstream locations of the component. In addition, the need to keep the coolant pressure at a level above that in the working gas path reduces the allowable pressure drop across the impingement jets, and hence the associated heat transfer levels. Further, most impingement schemes involve brazing or laser welding a sheet metal plate onto a cast component. The drilling of impingement holes into this plate adds cost, and the plate can become detached if the braze or weld cracks in the field due to thermal fatigue Thus, another option is to provide one or more internal cooling passages behind the endwall. Such passages are typically bounded between spaced upper and lower walls that follow the shape of the endwall. As shown in FIG. 3(a), one arrangement has multi-pass passages 40, optionally augmented with heat transfer augmentation features such as trip strips 41. Another arrangement has a wider passage 42 augmented with e.g. an array of staggered pedestals 43 (FIG. 3(b)) or parallel fins 44 (FIG. 3(c)) to increase the wetted plane area of the passage. In FIGS. 3(a)-(c) the block arrows indicate cooling air flows. Conveniently, such arrangements can usually be formed using single pull die ceramic core technology. However, the arrangements suffer from various limitations. For example, the multi-pass passage arrangement provides a relatively low wetted plane area, the wider passage with a staggered pedestal array also has a relatively low wetted plane area, and the wider passage with parallel fins can suffer from a low level of heat transfer as a boundary layer thickens along the channels formed by the fins. Coolant flow levels therefore have to be increased to offset the low wetted plane area and/or low level of heat transfer. Further, the heat transfer augmentation features can provide unreliable flow distributions, which in turn can lead to unreliable heat transfer coefficients.

SUMMARY OF THE INVENTION

An aim of the present invention is to provide internal cooling passages for endwalls that can provide performance benefits over conventional cooling passages.

Accordingly, a first aspect of the present invention provides a component of a turbine stage of a gas turbine engine, the component forming an endwall for the working gas annulus of the stage, and the component having one or more internal passages behind the endwall which, in use, carry a flow of cooling air providing convective cooling for the component at the endwall;

wherein each passage is formed by a plurality of straight passage sections which connect in end-to-end series such that the connections between nearest-neighbour passage sections form angled bends, and wherein a first portion of the passage sections lie in a first plane, a second portion of the passage sections lie in a second plane which is spaced from and parallel to the first plane, and a third portion of the passage sections extend between the first and the second planes.

The passages can be adapted to suit most endwall geometries, and can combine high heat transfer coefficients with high wetted plane areas.

The component may have any one or, to the extent that they are compatible, any combination of the following optional features.

Typically, the first and second planes are both spaced from and parallel to a gas washed plane of the endwall.

The or each passage can follow a straight overall path or a curved overall path. A straight overall path is typically followed when the gas washed plane of the endwall is flat, and a curved overall path is typically followed when the gas washed plane of the endwall is curved (and the first and the second planes are then also correspondingly curved). In this way, the passage can conform to the endwall, e.g. by maintaining a constant distance behind the endwall.

Preferably each passage is formed by at least ten passage sections.

The cross-sectional shape of the passage sections can be square, rectangular, circular etc.

The passage sections may have cross-sectional areas in the range from 0.2 to 10 mm². The lengths of the passage sections may be in the range from 1 to 5 mm.

Preferably, each passage section extends parallel to one of three axes, the first and second axes being parallel to the first and second planes, and the third axis being perpendicular to the first and the second planes. Limiting the possible axes along which the passage sections can extend can simplify the structure of the or each passage, while maintaining adaptability to endwall geometries, and high heat transfer coefficients. More preferably, every group of four successive end-to-end connected passage sections has at least one passage section extending along each axis. The passage section repeat distance (which corresponds to the number of passage sections in a characteristic motif for a passage) along the length of the or each passage can thus be kept short, allowing the passage to have relatively uniform heat transfer characteristics along its length. Indeed, every group of three successive end-to-end connected passage sections can have one passage section extending along each axis.

Typically, the three axes are mutually orthogonal. Consistent with this, the connections between nearest-neighbour passage sections can form 90° bends. However, if the axes are not mutually orthogonal, preferably the angle of the bend between any two connected passage sections is not less than about 70°. Smaller bend angles can risk causing excessive pressure drops and flow restrictions in the cooling air.

The passage sections of the first portion may extend parallel with the first axis, and the passage sections of the second portion may extend parallel with the second axis. Alternatively, some of the passage sections of the first portion and some of the passage sections of the second portion may extend parallel with the first axis, and the others of the passage sections of the first portion and the others of the passage sections of the second portion may extend parallel with the second axis. In both of these arrangements the first and second axes are thus parallel to the first and second planes. If these planes are curved, then the local directions of the first and second axes are adjusted so that the first and second axes remain parallel to the planes, i.e. the local curvatures of the first and second planes determine the local directions of the first and second axes.

The passage sections of the third portion may extend perpendicularly to the first and the second planes. Consistent with this, the passage sections of the third portion can extend parallel with the third axis when the third axis is orthogonal to the first and second axes and the first and second axes are parallel to the first and second planes. Extending the passage sections of the third portion perpendicularly to the first and the second planes facilitates forming the passages from a core that is producable from a single pull die.

The passage sections may be equal in length. In another configuration, however, the passage sections of two of the portions may have a first length, and the passage sections of the other portion may have a different second length. In yet another configuration, when each passage section extends parallel to one of the three axes, the passage sections extending parallel to the first axis may have a first length, the passage sections extending parallel to the second axis may have a second length, and the passage sections extending parallel to the third axis may have a third length, the first, second and third lengths all being different from each other.

Preferably, the component is a cast component, the passages being formable from a core during the casting of the component, and being configured such that the core is producable from a single pull die. This can reduce the cost of forming the component.

Typically, the component has an array of the passages extending in a layer behind the endwall, the layer preferably being parallel to the gas washed plane of the endwall. In this way, the passages can apply cooling across the area of the endwall. Neighbouring passages of the array can be joined in fluid communication with each other, such that cooling air can flow between the passages In one embodiment, the component can be a shroud segment providing a close clearance to the tips of a row of turbine blades which sweep across the segment. In another embodiment, the component can be a turbine blade, an inner platform of the blade forming the endwall. In yet another embodiment, the component can be a static guide vane, an inner or an outer platform of the vane forming the endwall. Indeed, in the static guide vane embodiment, both the platforms can have one or more of the internal passages.

BRIEF DESCRIPTION OF THE DRAWINGS

Embodiments of the invention will now be described by way of example with reference to the accompanying drawings in which.

DETAILED DESCRIPTION

Figure 4:
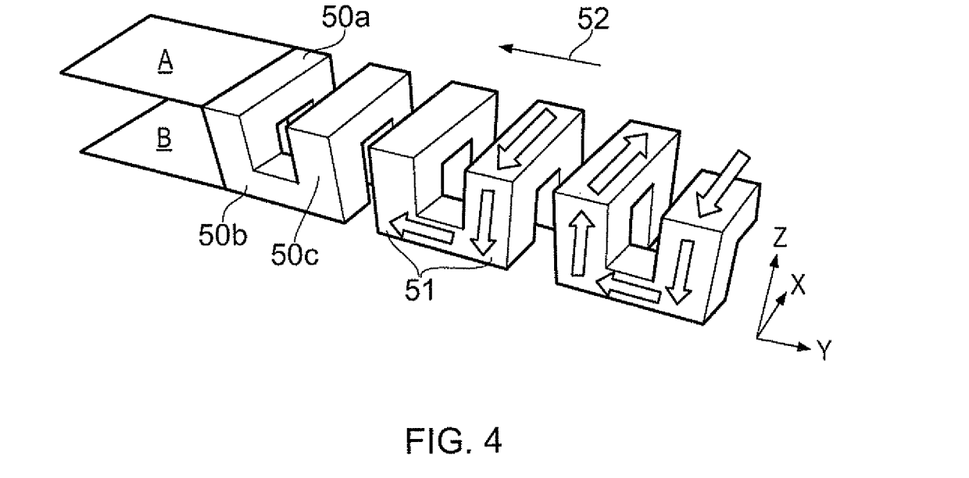
FIG. 4 shows schematically a configuration for an internal cooling passage.

FIG. 4 shows schematically a configuration for an internal cooling passage that can be located behind the endwall of a component of a turbine stage of a gas turbine engine. In use, cooling air flows along the passage, as indicated by the block arrows, to provide convective cooling of the endwall. The passage is formed from a plurality of short, straight, square-section passage sections $50a$, $50b$, $50c$, which in this example are all of equal length. The passage sections are connected in end-to-end series at successive 90° bends 51.

The passage has a direction of overall extension, indicated by the arrow 52. However, only some of the passage sections $50b$ are parallel with that direction. Other passage sections $50a$, $50c$ extend perpendicular to the direction of overall extension. A first portion $50a$ of the passage sections lie in a first plane (or surface A, and a second portion $50b$ of the passage sections lie in a second plane (or surface B. Planes A and B are typically parallel to the gas washed plane of the endwall. A third portion $50c$ of the passage sections extend perpendicularly to the first and the second planes. The passage sections $50a$ extend parallel to a first axis X, the passage sections $50b$ extend parallel to a second axis Y, and the passage sections $50c$ extend parallel to a third axis Z. Axes X, Y and Z are mutually orthogonal, with axes X and Y being parallel to planes A and B.

Every group of four successive end-to-end connected passage sections has at least one passage section which extends along each of the axes, with only one passage section $50b$ in each of these groups extending parallel to the direction of overall extension. Thus, the passage follows a convoluted path, with many changes of direction. The coolant flow within the passage has to negotiate these changes of direction, and consequently, the flow is continually separating and reattaching within the passage, ensuring that a thin boundary layer is maintained, and that high levels of turbulence occur. As a consequence, high levels of heat transfer can be achieved. However, because the passage sections repeat themselves every eight passage sections (i.e. they have a motif consisting of eight passage sections), the heat transfer characteristics of the passage are fairly uniform along the length of the passage.

Figure 5:
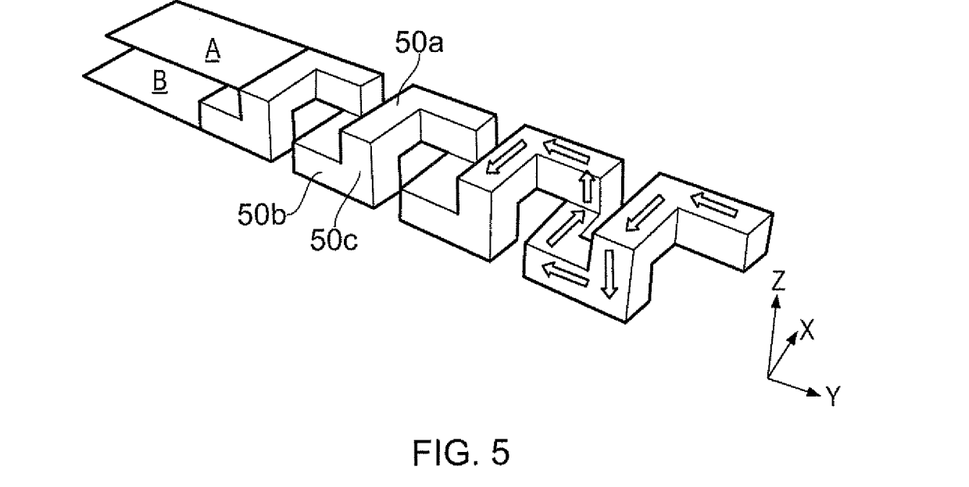
FIG. 5 shows schematically a further configuration for an internal cooling passage.

FIG. 5 shows schematically a different configuration for the internal cooling passage. In this configuration, every group of three successive end-to-end connected passage sections has one passage section extending along each of the axes X, Y, Z. The passage sections repeat themselves in this case every six passage sections. Further, the passage sections $50c$ which extend parallel to the Z axis and perpendicular to the planes A and B in FIG. 5 are shorter than the passage sections $50a$, $50b$, by a ratio of 2:3. Indeed, it is possible for the passage sections to have different lengths depending on which axis they extend along.

Figure 6:
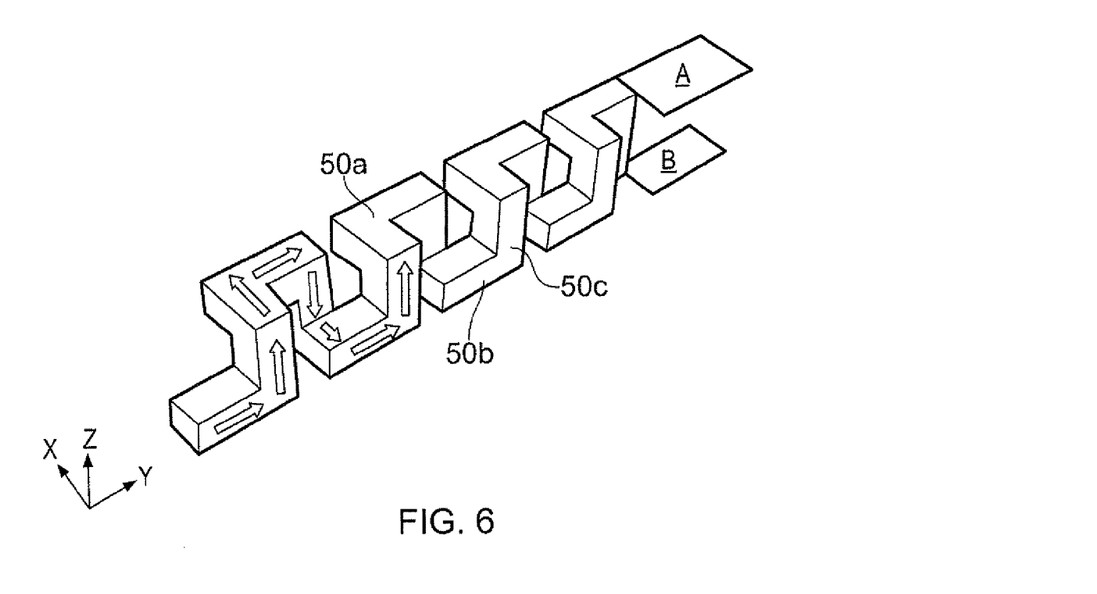
FIG. 6 shows schematically a further configuration for an internal cooling passage.
Figure 7:
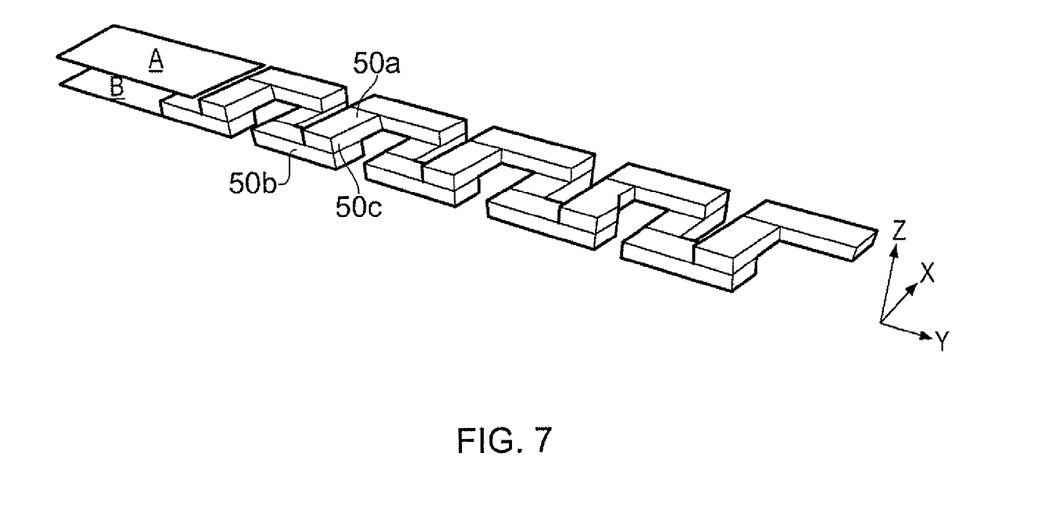
FIG. 7 shows schematically a further configuration for an internal cooling passage.

FIG. 6 shows schematically a passage that is similar to that of FIG. 5 except that in this case the shorter passage sections $50a$ lie in the planes A, B and are parallel to axis X. FIG. 7 shows schematically yet another passage that is similar to that of FIG. 5 except that the passage sections have a rectangular-section rather than a square-section. The rectangular-section provides a larger wetted area than the square-section. If desired, the shape of the cross-section can be changed along the length of the passage, e.g. to enhance heat transfer at specific locations.

Figure 8:
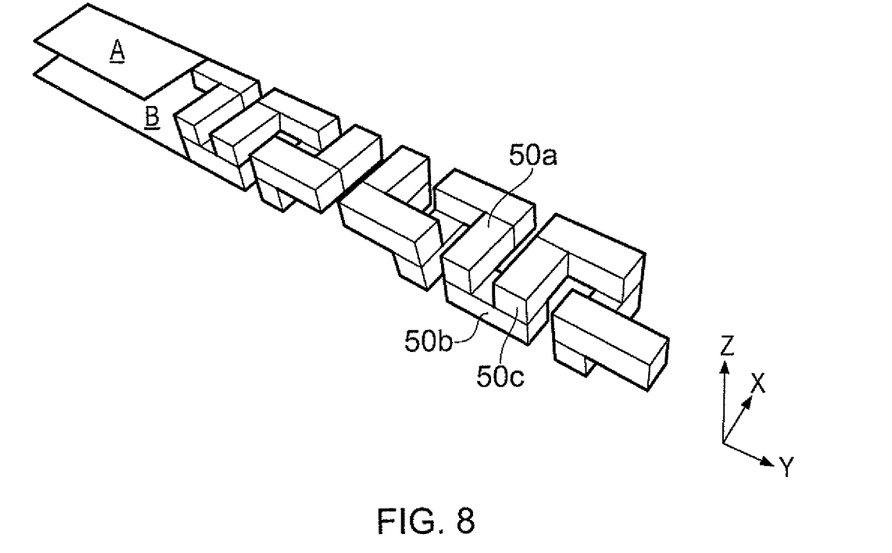
FIG. 8 shows schematically a further configuration for an internal cooling passage.
Figure 9:
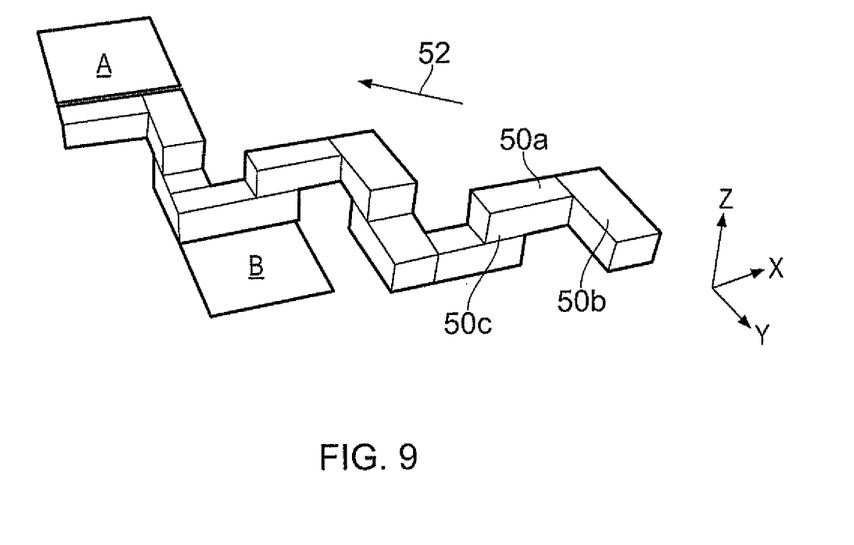
FIG. 9 shows schematically a further configuration for an internal cooling passage.

Other passage configurations are possible. FIG. 8 shows schematically a configuration for the passage that combines features of the passages of FIGS. 4 and 5. FIG. 9 shows schematically a configuration for the passage in which none of the passage sections are parallel to the direction of overall extension 52 of the passage. The coolant pressure drop per unit length of the passage may be less for the configuration of FIG. 9 than for the other passages, as the passage provides fewer changes of direction per unit length.

Figure 10:
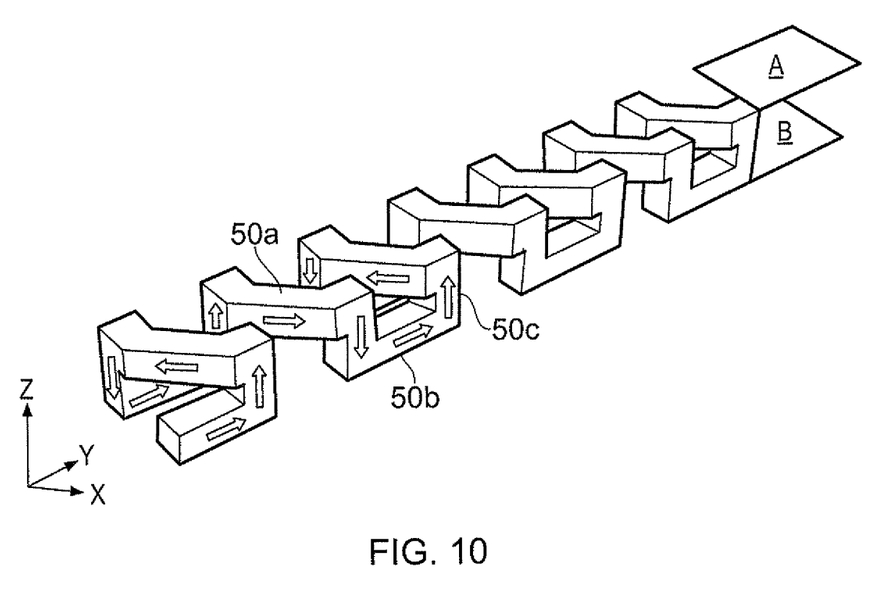
FIG. 10 shows schematically a further configuration for an internal cooling passage.

FIG. 10 shows schematically a configuration for the passage in which the axes X, Y, Z are not mutually orthogonal. In this case, axis Z is perpendicular to axes X, Y, but axis X is angled at about 45° to axis Y. Nonetheless, as each passage section $50a$ extending parallel to axis X connects at both ends to passage sections $50c$ extending parallel to axis Z, the cooling air flowing into and out of each passage section $50a$ turns through 90° bends, which do not lead to excessive pressure drops in the cooling air. In general, to avoid excessive pressure drops, the angle of the bend between any two connected passage sections is preferably not less than about 70°.

Figure 11:
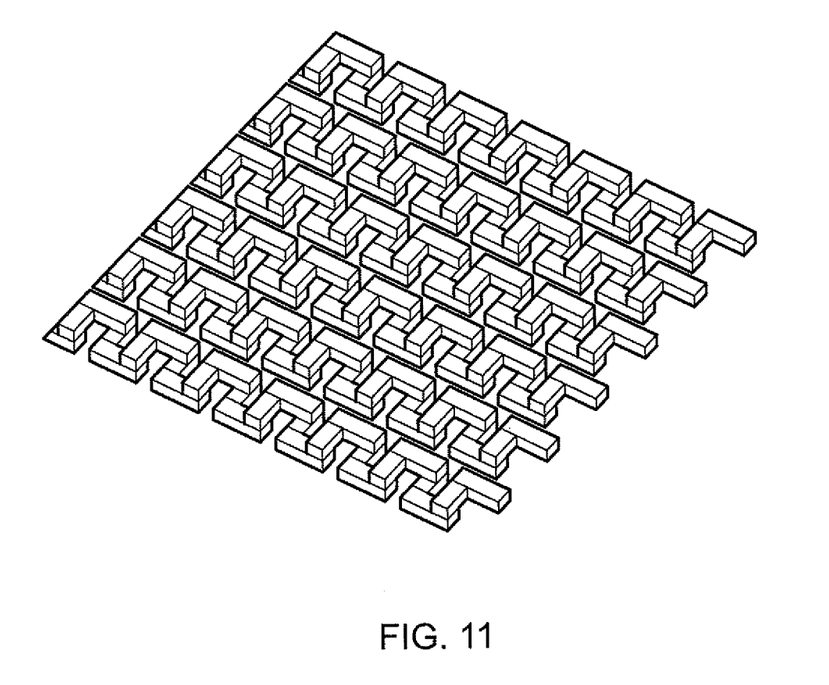
FIG. 11 shows schematically a flat array of internal cooling passages.
Figure 12:
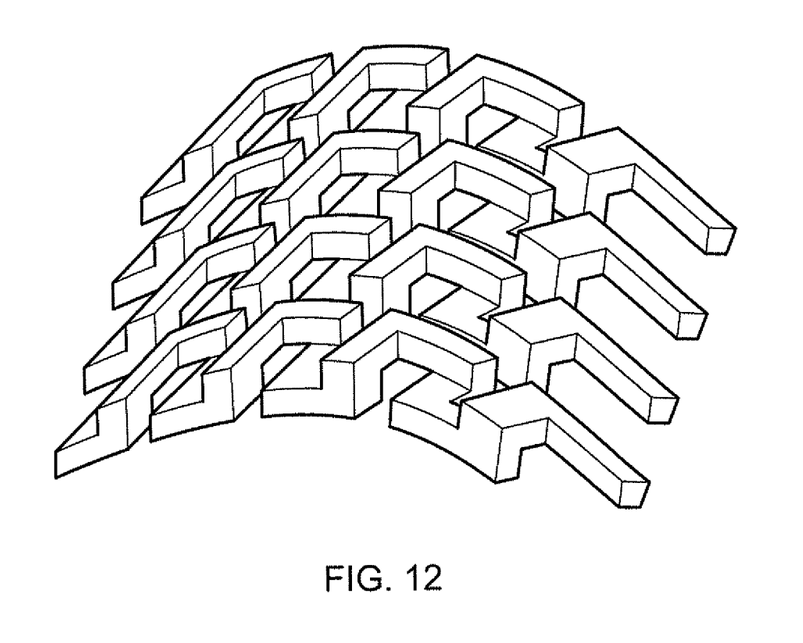
FIG. 12 shows schematically a curved array of internal cooling passages.

The endwall can have an array of the passages extending in a layer behind the wall. FIG. 11 shows schematically such an array which is flat, based in this case on side-by-side passages having the configuration of FIG. 5. However, if the gas-washed plane of the endwall is curved, then conveniently the individual passages and the array as a whole can be curved to conform with the shape of that plane, as shown in FIG. 12 which is a curved array of passages having the configuration of FIG. 5. In FIG. 12, the passage sections $50a$ still extend parallel to the first axis X, the passage sections $50b$ still extend parallel to the second axis Y, and the passage sections $50c$ still extend parallel to a third axis Z. However, as the planes A and B are curved to match the curvature of the gas washed plane, the direction of the axes X, Y and Z at any point are determined relative to the tangent plane to plane A or B at that point.

In FIGS. 11 and 12, no links are shown connecting the passages of each array. In practice, however, it can be advantageous to form links between neighbouring passages so that coolant can flow between the passages. This can allow any dirt or debris blockages in the passages to be circumvented, and can help to equalise coolant pressures across the passages. The links can also strengthen the cores (discussed below) from which the passages can be formed.

The component can have one or more reservoirs from which to feed cooling air to the passages. The reservoir(s) can have a dual role supplying cooling air onto the gas washed plane of the endwall through a series of film cooling holes as well as supplying cooling air to the passages. In general, the coolant supplied to the passages is required to have a relatively high pressure ratio because the numerous bends cause significant pressure losses.

In typical applications, the passage sections may have cross-sectional areas in the range from 0.2 to 10 mm². The lengths of the passage sections may be in the range from 1 to 5 mm.

The configurations discussed above can be manufactured using single pull die ceramic core technology, as used for conventional passages augmented with pedestals, pin-fins, trip strips etc. In particular, having the passage sections 50c extend perpendicularly to the planes A, B and the gas-washed plane of the endwall facilitates the use of this technology. There is, therefore, no need for costly multiple slide dies or soluble core technologies. However, these advanced casting technologies may allow more diverse passage shapes to be achieved. Individual passages can be produced separately. Alternatively an array of passages can be produced with common entries or exits, or arrays of passages can be produced connected at designated locations to neighbouring passages.

Advantageously, the passage configurations facilitate the formation of a compact internal heat exchanger arrangement which can be adapted to suit almost any endwall geometry. These heat exchangers have the ability to deliver high levels of heat transfer with increased wetted plane area in locations of the turbine where adequate pressure drop to drive the cooling flow is available. They can be configured in single or multiple arrays and can be made to conform to most curved planes and shapes. They can be manufactured using ceramic cores produced from conventional single pull dies and are therefore a cost effective alternative to impingement and pedestal arrays.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A component forming an endwall for a working gas annulus of a turbine stage of a gas turbine engine comprising:
    one or more internal passages behind the endwall which, in use, carry a flow of cooling air providing convective cooling for the component at the endwall, the internal passages comprising:
        a plurality of straight passage sections which connect in end-to-end series to provide a single flow path such that the connections between nearest-neighboring passage sections form angled bends,
        wherein a first portion of the passage sections lie in a first plane, a second portion of the passage sections lie in a second plane which is spaced from and parallel to the first plane, and a third portion of the passage sections extend between the first and the second planes,
        wherein the internal passages extend between the first and second planes multiple times along the length of each internal passage, and
        wherein the first plane and the second plane are both spaced from and parallel to a gas washed plane of the endwall.

2. A component according to claim 1, wherein each passage section extends parallel to one of three axes, the first and second axes being parallel to the first and second planes, and the third axis being perpendicular to the first and the second planes.

3. A component according to claim 2, wherein the axes are mutually orthogonal.

4. A component according to claim 2, wherein every group of four successive end-to-end connected passage sections has at least one passage section extending along each axis.

5. A component according to claim 2, wherein the passage sections of the first portion extend parallel to the first axis, and the passage sections of the second portion extend parallel to the second axis.

6. A component according to claim 2, wherein some of the passage sections of the first portion and some of the passage sections of the second portion extend parallel to the first axis, and the others of the passage sections of the first portion and the others of the passage sections of the second portion extend parallel to the second axis.

7. A component according to claim 1, wherein the passage sections of the third portion extend perpendicularly to the first and the second planes.

8. A component according to claim 1, wherein each passage is formed by at least ten passage sections.

9. A component according to claim 1, wherein the passage sections are equal in length.

10. A component according to claim 1, which is a cast component, the passages being formable from a core during the casting of the component, and being configured such that the core is producible from a single pull die.

11. A component according to claim 1, having an array of the passages extending in a layer behind the endwall.

12. A component according to claim 11, wherein neighboring passages of the array are joined in fluid communication with each other.

13. A component according to claim 1, wherein the component is a shroud segment providing a close clearance to the tips of a row of turbine blades which sweep across the segment.

14. A component according to claim 1, wherein the component is a turbine blade, an inner platform of the blade forming the endwall.

15. A component according to claim 1, wherein the component is a static guide vane, an inner or an outer platform of the vane forming the endwall.

16. A component according to claim 1, wherein each passage has an entry end and an exit end along the single flow path,
    wherein the plurality of straight passage sections are disposed between the entry end and the exit end, and
    wherein the flow of cooling air travels along the single flow path through the plurality of passages without exiting the plurality of passages until the flow of cooling air reaches the exit end.

17. A component according to claim 1, wherein the first and second planes extend in a direction perpendicular to an opening of the internal passages.

18. A component forming an endwall for a working gas annulus of a turbine stage of a gas turbine engine comprising:
    one or more internal passages behind the endwall which, in use, carry a flow of cooling air providing convective cooling for the component at the endwall, the internal passages comprising:
        a plurality of straight passage sections which connect in end-to-end series to provide a single flow path such that the connections between nearest-neighboring passage sections form angled bends, wherein a first portion of the passage sections lie in a first plane, a second portion of the passage sections lie in a second plane which is spaced from and parallel to the first plane, and a third portion of the passage sections extend between the first and the second planes, wherein each passage section extends parallel to one of three axes, the first and second axes being parallel to the first and second planes, and the third axis being perpendicular to the first and the second planes, wherein the axes are mutually orthogonal, and wherein the internal passages extend between the first and second planes multiple times along the length of each internal passage.

* * * * *